Jan. 26, 1926.
G. W. CISCO
INCUBATOR
Filed June 3, 1920 — 4 Sheets-Sheet 1
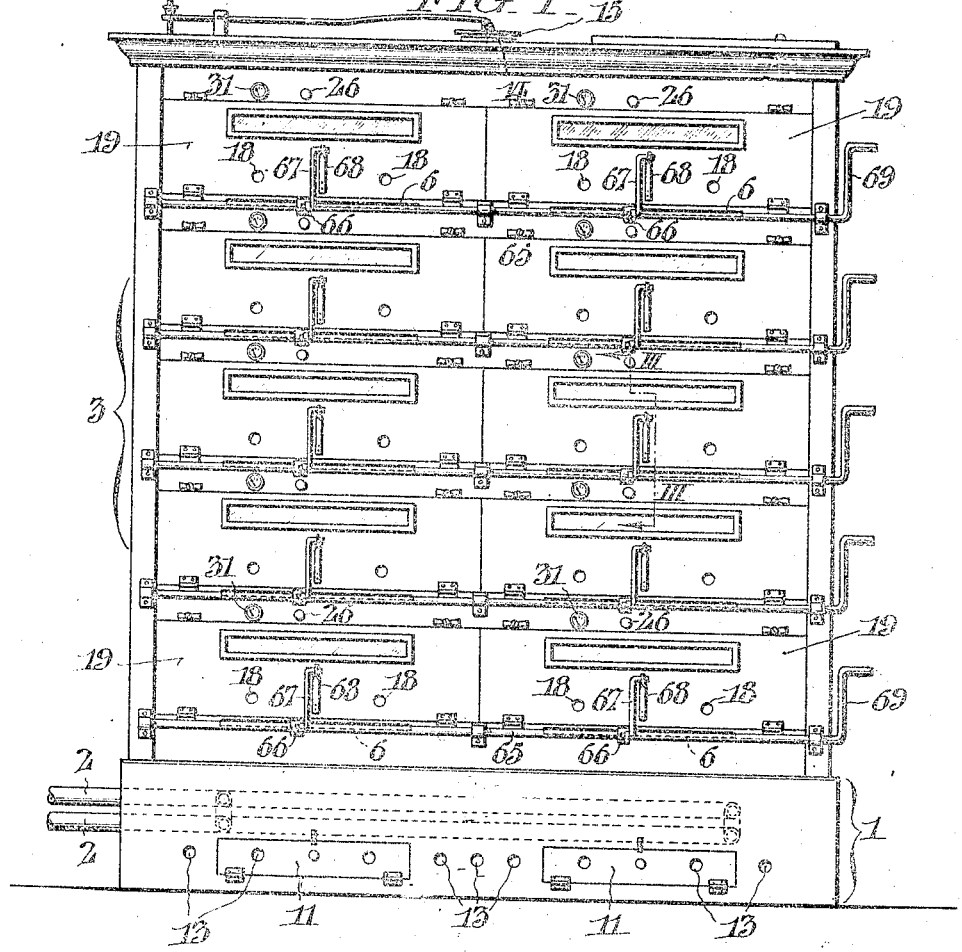
FIG. I
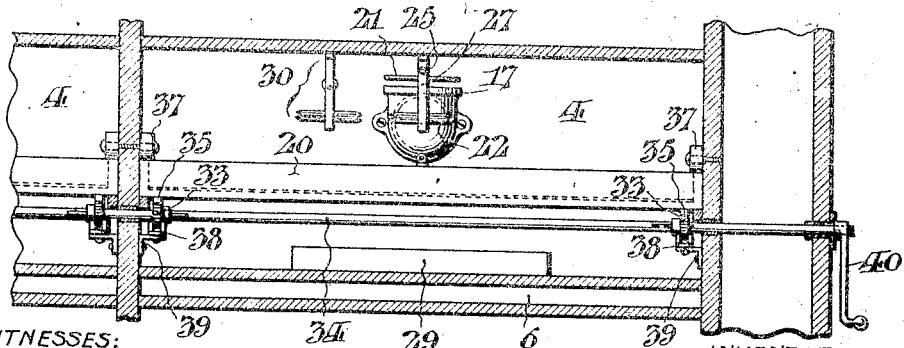
FIG. VII
WITNESSES:
John C. Bergner
James H. Bell
INVENTOR:
George W. Cisco,
BY
ATTORNEYS.

Jan. 26, 1926.   G. W. CISCO   1,570,944
INCUBATOR
Filed June 8, 1920   4 Sheets-Sheet 2
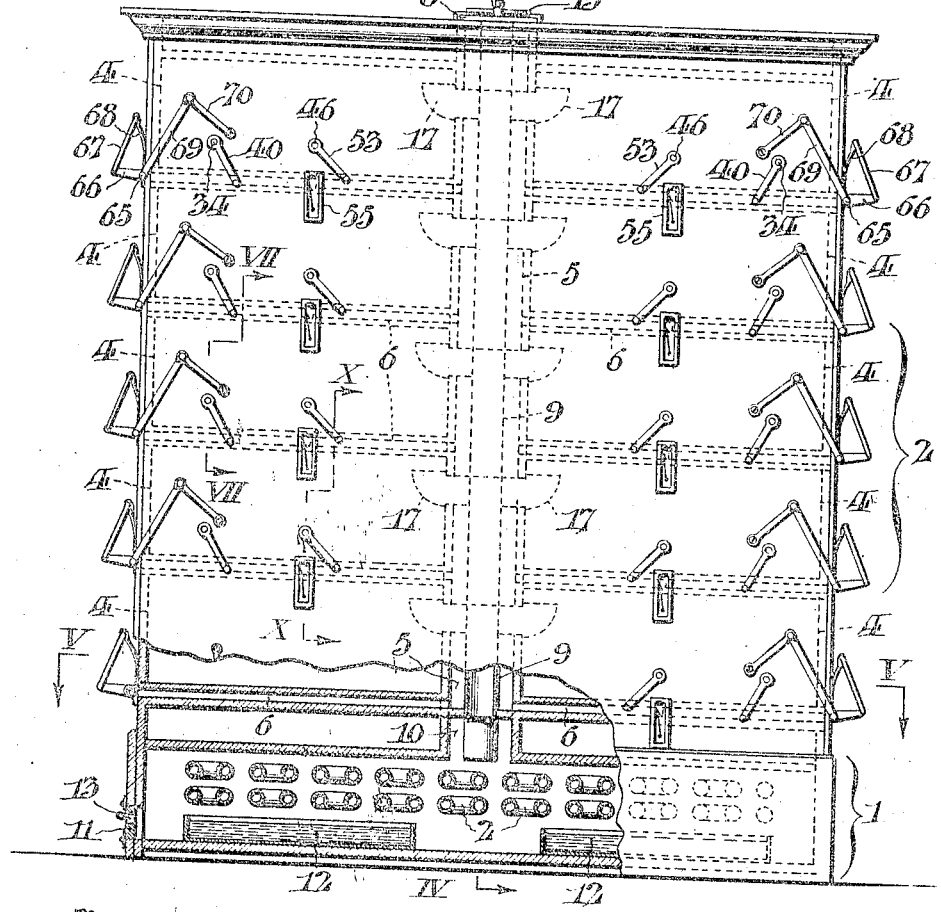
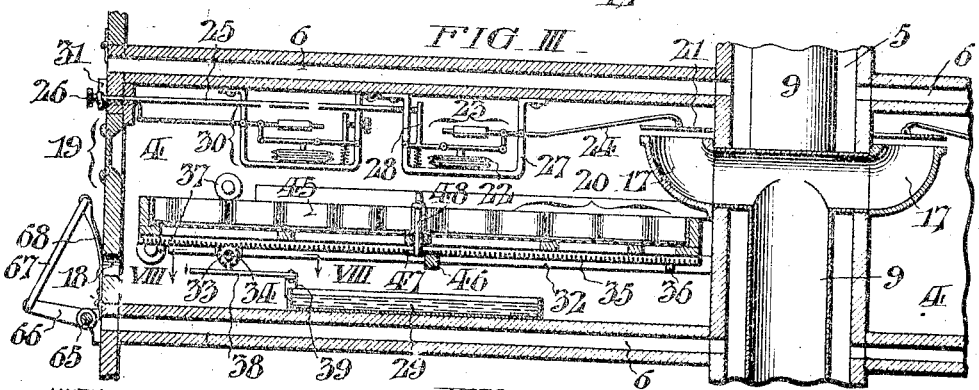
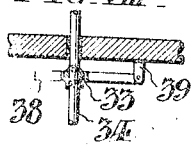
WITNESSES:   INVENTOR:
George W. Cisco,
BY
ATTORNEYS.

Jan. 26, 1926. 1,570,944
G. W. CISCO
INCUBATOR
Filed June 8, 1920 4 Sheets-Sheet 3
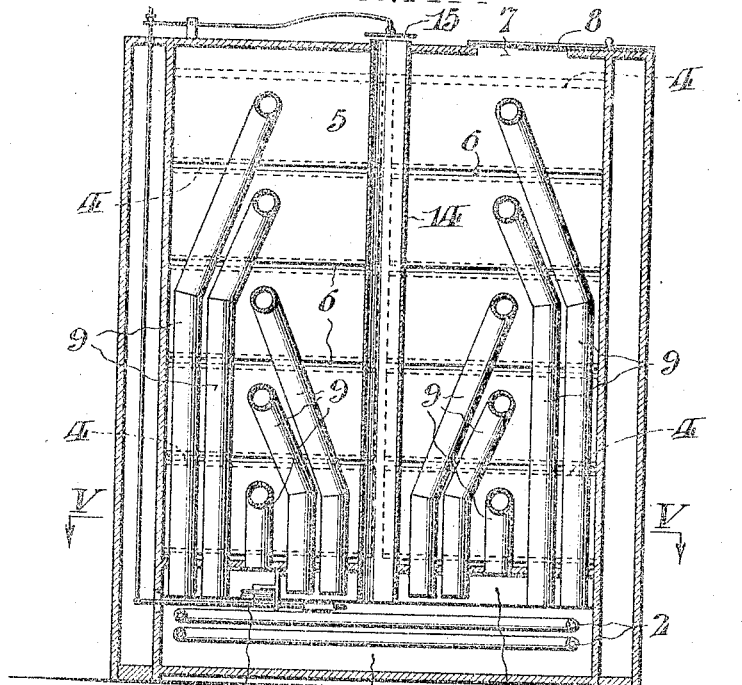
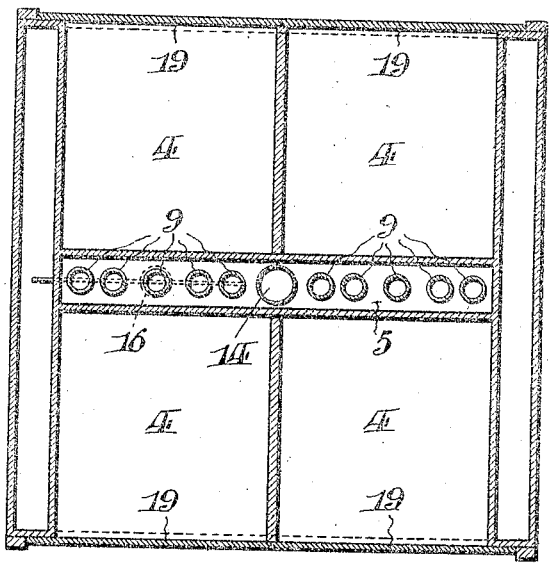
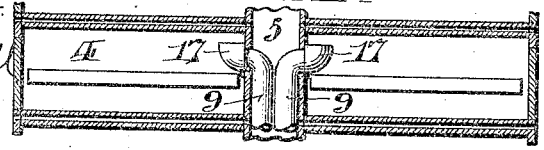
WITNESSES: INVENTOR:
George W. Cisco,
BY
ATTORNEYS.

Jan. 26, 1926.　　　　　　　　　　　　　　1,570,944
G. W. CISCO
INCUBATOR
Filed June 8, 1920　　　4 Sheets-Sheet 4
FIG. IX.
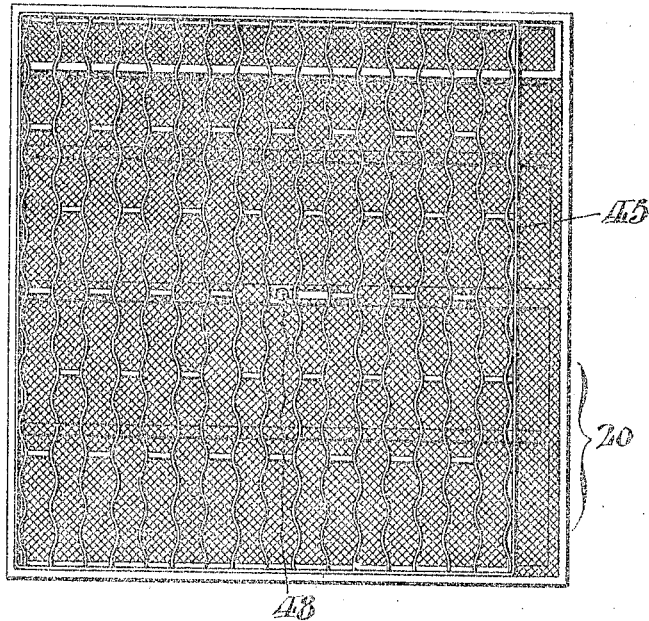
FIG. X.
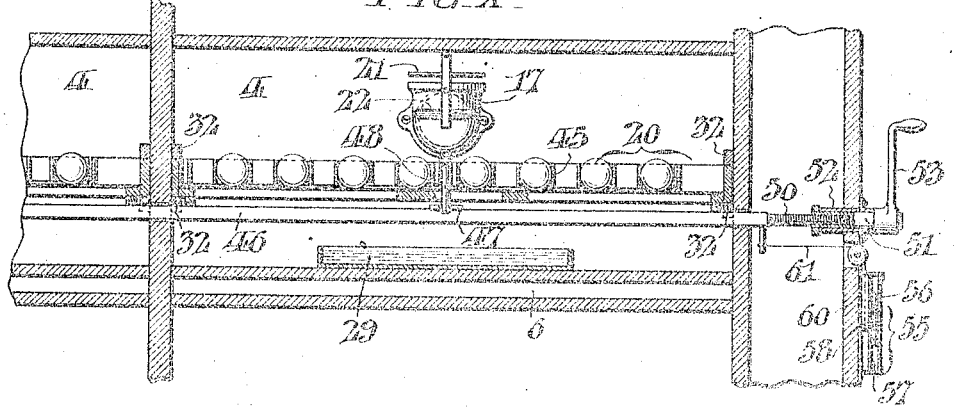
FIG. XI.
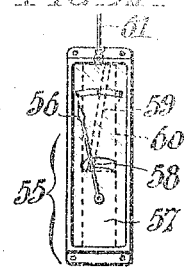
WITNESSES:　　　　　　　　　　　　INVENTOR:
　　　　　　　　　　　　　　　　　　George W. Cisco,
　　　　　　　　　　　　　　　　　　BY
　　　　　　　　　　　　　　　　　　　　ATTORNEYS.

Patented Jan. 26, 1926.

1,570,944

UNITED STATES PATENT OFFICE.

GEORGE W. CISCO, OF HAWTHORNE, NEW JERSEY.

INCUBATOR.

Application filed June 8, 1920. Serial No. 387,382.

*To all whom it may concern:*

Be it known that I, GEORGE W. CISCO, a citizen of the United States, residing at Hawthorne, in the county of Passaic and State of New Jersey, have invented certain new and useful Improvements in Incubators, whereof the following is a specification, reference being had to the accompanying drawings.

The invention relates to incubators, and is directed to the attainment of greater economy in floor space in incubator installations of large capacity with corresponding saving of material and more efficient conservation of heat than has been heretofore practicable; greater uniformity in distribution of heat to the numerous separate incubation chambers involved; and greater simplicity of operation so that routine work incidental to the incubation period such as the turning of the eggs and projection of the trays for airing, may be accomplished with minimum loss or expenditure of time.

Other advantages obtainable through the invention will become apparent from the description which follows.

In the accompanying drawings, Fig. I is a side elevation of an incubator structure conveniently embodying my invention.

Fig. II is an end elevation of the same from the right of Fig. I, the lower portion being broken away so as to set forth more advantageously certain details of the construction of the interior.

Fig. III is a cross section through one of the incubation chambers, taken as indicated by the line III—III in Fig. I.

Fig. IV is a longitudinal sectional view of the structure on a slightly reduced scale, taken as indicated by the arrows IV—IV in Fig. II.

Fig. V is a plan section of the same along the line V—V in Figs. II and IV.

Fig. VI is a view similar to Fig. III, somewhat more diagrammatically represented, showing a slight modification.

Fig. VII is a sectional view through one of the incubation chambers taken as indicated by the line VII—VII in Fig. II.

Fig. VIII is a detail fragmentary plan, taken as indicated by the line VIII—VIII in Fig. III, showing one of the devices by which the egg trays can be connected or disconnected from the projecting means.

Fig. IX is a plan view of one of the trays by which the eggs are supported.

Fig. X is a cross sectional view through one of the incubation chambers taken as indicated by the line X—X in Fig. II; and Fig. XI is a detail view showing a gauge adapted to indicate the direction in which the eggs are turned in the trays.

Referring first to Figs. I, II, IV and V, it will be noted that the structure, as therein represented, has at its base a heating compartment 1 which may be heated in any approved manner, such for example, as by a series of horizontally disposed banks of hot water pipe coils represented conventionally at 2—2 in the illustrations. Surmounting the heating compartment 1 is a superstructure 3, which is subdivided into a multiplicity of separate incubator chambers 4, these being disposed in the present instance, in superimposed relation and grouped in sections or stacks of column form each comprising an equal number of subdivisions. Said sections are preferably arranged back to back as seen in Fig. II, so that each side of the structure presents the appearance of Fig. I. The chambered column sections or stacks are separated by a longitudinal central passage 5, which communicates with the exterior through horizontal spaces or openings 6 between adjacent incubation chambers. The passage 5 also communicates with the exterior through an opening 7 at its top, said opening being provided with a slidable cover 8, by which the extent of free air circulation through the communicative channeling just described may be definitely controlled. Such free circulation through the structure prevents cross heating between the several incubation chambers, so that they are, as a consequence, thermally independent of one another notwithstanding varying temperature conditions which may prevail in them, for example, when eggs in different stages of development are being incubated at one time.

While I have herein shown an incubator structure comprising but two column sections at each side, it will be obvious that this number may be increased indefinitely.

The incubation chambers 4 are connected with the heating compartment 1 by conduits or ducts 9 which are symmetrically disposed within the passage 5, as shown in Fig. IV. Such connections may be made individually as represented in Fig. VI, or the incubation chambers or corresponding levels in adjacent column sections may be supplied in pairs according to the showing of Fig. III, the latter method of separately supplying superposed chambers admitting of greater simplicity of construction. In order that the heated air may be uniformly distributed through the numerous incubation chambers, or that the distribution of heat amongst the chambers by the air delivered to them may be equalized, the lower ends of the conduits 9 are so arranged as to draw from different levels in the heating compartment according to the height of the incubation chambers which they respectively supply, thereby obviating the inequality of drawing power which would otherwise obtain by virtue of the different lengths of said conduits. As a further precaution for positively preventing robbing of the lowermost of the incubation chambers on account of the comparative shortness of their supply conduits, I prefer to supplement the heating compartment 1 with a longitudinal pocket 10, which is offset above the main portion of said compartment and from the upper region of which these conduits are directly supplied. The heating compartment has doors 11 preferably at both sides of the structure so that access may be had to the interior to permit replenishing the moisture pans 12 with water from time to time. Fresh air enters the heating compartment 1 through openings 13 distributed at intervals along its side walls as shown in Fig. I. In order to guard against overheating, the compartment 1 is provided with a flue conduit 14 which extends upwardly preferably through the center of the structure, and discharges to the exterior. The escape of the surplus heat is controlled by a damper 15, whose action is governed automatically by a thermostat mechanism 16, best seen in Fig. IV. The conduits 9 terminate at their tops in upturned outlets 17 through which the heated air is discharged into the incubation chambers.

Since the incubation chambers, together with their various appurtenances are exact counterparts of one another, it will be convenient to confine attention for the time being to Figs. III, VII and X, and to refer to the constituent parts in the singular. From these illustrations, it will be noted that the hot air supply outlet 17 is located at a central point of the rear wall of the incubation chamber and in close proximity to the top of the latter. By providing discharge openings 18 near the bottom edges of the hinged doors 19, which serve to close the chamber at the front, the heated air delivered from the outlet 17 is compelled to flow downwardly through the egg tray designated at 20, toward said openings, thus determining definitely a circulatory course such that uniform local distribution is assured. The influx of the heating medium is governed by a damper 21 which is automatically controlled according to the temperature within the chamber by a wafer thermostat 22 connected through a multiplying leverage system comprehensively indicated at 23 to the balance arm 24 of the damper. This leverage system is capable of being adjusted so that the thermostat shall cut off the supply of the heated air at any predetermined temperature, by means of a regulating rod 25 which terminates at the exterior of the structure in a knurled manipulating head 26, and whose inner end is screw threaded through a portion of the thermostat supporting bracket 27 to engage the vertical arm of a spring pressed bell crank lever 28 forming part of said system.

As a means for augmenting the humidity of the air locally according to the temperature prevailing in the chamber, I prefer to employ a supplemental moisture pan 29. By this provision, the varying degrees of humidity required during different stages of the incubation period are automatically obtained in accordance with local temperature without depending entirely upon the moisture charge initially supplied in the heating compartment 1 by the pans 12.

Each incubation chamber is also provided with a thermostat mechanism 30 which is similar to the one previously described, and serves in a like manner, through leverage connections, to operate a dial indicator 31 at the front of the chamber, so that the temperature may be read directly without the opening of the door 19 to inspect thermometers such as are ordinarily employed for this purpose.

The egg tray is slidably supported between guides 32—32 attached in pairs to the sides of the chamber (so as to be capable of being projected from within by means of pinions 33—33 mounted upon a shaft 34 and normally engaging toothed racks 35—35 secured to the bottom of the tray preferably near its side edges, as clearly shown in Fig. VII. The extent to which the tray may be projected is limited by projections 36, which are adapted to come to a stop against the pinions 33. When fully protruded, support of the tray is transferred to cooperative rollers 37—37, see Fig. III. In order that the tray may be disconnected from the projecting mechanism, as is some times desirable in practice, I have provided means for effecting disengagement between the pinions and the racks in the form of shifting levers 38 (Figs. VII and VIII), which are pivoted to brackets 39, extending outwardly from the side walls of the chamber and supplemented with projections between which the pinions are engaged. As illustrated in Figs. II and VII, a shaft 34 is provided for each series of horizontally aligned chambers. These shafts may be rotated by means of crank handles 40 attached to their ends'that protrude through the end wall of the incubation structure as best seen in Fig. VII. By this arrangement, the trays in any aligned series of chambers may be simultaneously projected to permit inspection of the eggs or to subject them from time to time to airing, which, as is well known, is necessary to the process of proper incubation. When it is desired to prevent the projection of any tray of the series, such tray may be disconnected from the actuating means by shifting its gear pinions 33 as above noted without interfering with projection of the others of the series.

Referring once more to Figs. III and X, it will be noted that within the egg tray is mounted a cellular grid 45 which is preferably constructed of light metal. The grid is slightly smaller in one dimension than the tray, so that it may be shifted to a limited extent therein sufficient to roll the eggs through a half turn while supported on the egg screen. Actuation of the grid is accomplished by a longitudinally shiftable slide bar 46, which has attached to it a bifurcated projection 47 adapted to engage a pin removably secured in the grid at its center. As in the case of the shafts 34 previously referred to, there is a slide bar 46 for each series of aligned incubator chambers, so that the eggs may be turned simultaneously in each of such sub-groupings of the incubator structure. In the course of projecting the trays as hereinafter described, it will be seen the pins 48 will readily slip from engagement with the bifurcations 47 and as readily again engage with the same when returned to normal position in the chambers. For the time being, however, the projection of an egg tray disconnects its egg turning means from the general egg turning means 46 and renders the latter ineffective upon the eggs in such tray. The end of each of the rods 46 (Figs. II and X), is threaded as indicated at 50 for cooperation with an internally threaded sleeve 51 journalled for rotation in a bearing 52 extending through the side wall of the incubator structure. To the protruding end of the sleeve 51 is secured a handle 53 which, when turned in one direction or the other, causes a corresponding movement of the grids 45 in the egg trays. For the purpose of recording the shiftings of the trays, a gauge 55 is associated with each of the handles 53. As best seen in Figs. X and XI, each of these gauges 55 comprises a pointer 56 which moves over a graduated dial 57. Projecting rearwardly from the pointer is a pin 58 which engages within an inclined slot 59 of a weighted member 60 guided for vertical sliding in the casing of the gauge in accordance with the shifting of the rod 46, by virtue of a cord connection 61 therewith. By means of the gauges 55, the operator may, at a glance, ascertain in which direction the handles 53 are to be rotated for the next turning of the eggs without the necessity of actually inspecting the trays in the incubation chambers.

The doors 19 for the chambers 4 are also so arranged as to be operative in series in a manner which will be readily understood from Figs. I, II and III. As there shown, an actuating shaft 65 is common to each of such series, and is provided with lever arms 66, which, through links 67 are individually coordinated with resiliently flexible connectors 68, attached to the doors. The ends of the shafts 65 are bent to form crank handles 69 which are normally held in the locked position shown in Fig. II by hooks 70, so as to maintain the flexible connectors 68 under sufficient pressure to hold the doors securely closed. The links 67 are connected in such manner as to be easily detached at one end in case it is desired to avoid the operation of anyone of the doors in the series.

By means of the various provisions set forth herein, it will be seen that opening of the doors of the incubation chambers, and projection of the trays for the purpose of airing the eggs may be speedily accomplished, and furthermore, when the eggs in any particular chamber are not to be disturbed, as is requisite at certain stages of incubation, the doors of such chamber and also the tray therein, may be readily disconnected from the actuating means in the corresponding series. The like also holds as to selectively in turning the eggs in the incubation chambers in the various series.

Having thus described my invention, I claim:

1. An incubator comprising a casing having therein a vertical series of compartments including a heating compartment and a plurality of incubation chambers, means in said heating compartment for heating the air therein, and means for delivering the heated air to the incubation chambers and automatically equalizing the distribution of heat thereby to the chambers at different heights.

2. An incubator comprising a casing having therein a vertical series of compartments including a heating compartment and a plurality of incubation chambers, means in said heating compartment for heating the air therein, means for delivering the heated air to the incubation chambers and automatically equalizing the distribution of heat thereby to the chambers at different heights, and means for by-passing and discharging heated air from said heating compartment without admission to said incubation chambers.

3. An incubator comprising a casing having therein a vertical series of compartments including a heating compartment and a plurality of incubation chambers, means in said heating compartment for heating the air therein, with means for delivering the heated air to the incubation chambers and automatically equalizing the distribution of heat thereby to the chambers at different heights comprising separate ducts from said heating compartment and separate outlets from the casing for the individual chambers.

4. An incubator comprising a casing having therein a vertical series of compartments including a heating compartment and a plurality of incubation chambers, with interspaces separating superposed incubation chambers and communicating with the exterior so as to permit free air circulation and prevent cross heating between the incubation chambers; means in said heating compartment for heating the air therein; and means for delivering the heated air to the incubation chambers and automatically equalizing the distribution of heat thereby to the chambers at different heights.

5. An incubator comprising a casing having therein a vertical series of compartments including a heating compartment and a plurality of incubation chambers, with interspaces separating superposed incubation chambers and communicating with the exterior so as to permit free air circulation and prevent cross heating between the incubation chambers; means in said heating compartment for heating the air therein; and means for delivering the heated air to the incubation chambers and automatically equalizing the distribution of heat thereby to the chambers at different heights comprising separate ducts from said heating compartment and separate outlets from the casing for the individual chambers.

6. An incubator comprising a casing having therein a heating compartment surmounted by vertical series of incubation chambers separated by an intervening vertical air space, with interspaces separating superposed incubation chambers and communicating with said vertical air space and with the exterior, so as to permit free air circulation and prevent cross heating between the incubation chambers; means in said heating compartment for heating the air therein; and means for delivering the heated air to the incubation chambers and automatically equalizing the distribution of heat thereby to the chambers at different heights, including separate ducts from said heating compartment within the casing.

7. An incubator comprising a casing having therein vertical series of compartments including a heating compartment and a plurality of completely separated stacks of incubation chambers; means in said heating compartment for heating the air therein; means between said vertical stacks of compartments for distributing air from said heating chamber to the compartments of each stack in parallel; and means for regulating the distribution of heated air between the stacks.

8. In an incubator, the combination of a heating compartment; a multiplicity of separate, relatively superimposed, incubation chambers surmounting said heating compartment, and conduits connecting the incubation chambers with the heating compartment, said conduits drawing from such different levels in the heating compartment, according to the height of the respective incubation chambers which they supply, as to insure uniform distribution of the heat through the system.

9. An incubator structure comprising a number of composite sections each comprehending a multiplicity of separate incubation chambers, said sections and adjacent incubation chambers in each being separated by interspaces communicating with each other and with the exterior so as to permit free air circulation and prevent cross heating between the several incubator chambers.

10. An incubator structure comprising a number of composite sections each comprehending a multiplicity of separate incubation chambers, said sections and adjacent incubation chambers in each being separated by interspaces communicating with each other and with the exterior so as to permit free air circulation and prevent cross heating between the several incubator chambers; and means for controlling the extent of such free air circulation.

11. An incubator structure comprising a number of composite sections, each comprehending a multiplicity of separate superimposed incubation chambers, said sections being spaced from each other by a vertical passage communicating with the exterior through horizontal openings between adjacent incubation chambers in said sections, so as to permit free air circulation and prevent cross heating between the incubation chambers.

12. In an incubator, the combination of a heating compartment; a number of composite sections each comprehending a multiplicity of separate superimposed incubation chambers surmounting said heating compartment and spaced from each other by a vertical passage having communication with the exterior; and conduits connecting the incubation chambers individually with said heating compartment, said conduits being disposed within said vertical passage and, by virtue of the free air circulation therein, thermo insulated from each other against cross heating.

13. An incubator comprising a heating compartment; a multiplicity of separate, relatively superimposed, incubation chambers surmounting said heating compartment; and conduits connecting the incubation chambers with the heating compartment, said compartment being supplemented with a pocket offset at a higher elevation than the main portion thereof, the conduits leading to the lowermost incubation chambers drawing from the upper region of said pocket and the remaining conduits drawing from different levels of the heating compartment according to the height of the respective incubation chambers which they supply.

14. In an incubator, the combination of an air heating compartment; a multiplicity of separate, relatively superimposed, incubation chambers surmounting said compartment, separately connected therewith and receiving hot air therefrom; means for automatically governing the temperature in the heating compartment; and individual means for automatically controlling the temperature in each of the incubation chambers.

15. An incubator comprising a series of incubation chambers each with a slidable egg tray, means for simultaneously turning the eggs in the several trays, and means for simultaneously or selectively sliding said trays and thereby rendering the egg-turning means ineffective upon the eggs in the trays so slid.

16. An incubator comprising a series of incubation chambers each with a slidable egg tray, egg-turning means for each tray, means extending lengthwise of the series for simultaneously actuating said egg turning means, and means for simultaneously or selectively sliding said trays and thereby disconnecting their egg turning means from said actuating means.

17. An incubator comprising a series of incubation chambers each with an egg tray slidable in or out of the chamber transversely of the series, egg-turning means for each tray, means extending and movable lengthwise of the series for simultaneously actuating said egg turning means from which the latter is disengageable by sliding of the trays as aforesaid, and means for simultaneously or selectively sliding said trays transversely as aforesaid to project them from the incubation chambers.

In testimony whereof, I have hereunto signed my name at city of Paterson, N. J., this 29th day of May, 1920.

GEO. W. CISCO.